July 26, 1960 G. K. MURPHY 2,946,294
HIGH-CAPACITY PRIVATE COMPARTMENT PASSENGER VEHICLE
Filed May 3, 1957 2 Sheets-Sheet 1

INVENTOR
Goodrich K. Murphy
BY
Wm. R. Glisson
ATTORNEY

July 26, 1960  G. K. MURPHY  2,946,294
HIGH-CAPACITY PRIVATE COMPARTMENT PASSENGER VEHICLE
Filed May 3, 1957  2 Sheets-Sheet 2

INVENTOR
Goodrich K. Murphy
BY Wm. R. Glisson
ATTORNEY

United States Patent Office 2,946,294
Patented July 26, 1960

2,946,294

HIGH-CAPACITY PRIVATE COMPARTMENT PASSENGER VEHICLE

Goodrich K. Murphy, New Canaan, Conn., assignor to The Budd Company, Philadelphia, Pa., a corporation of Pennsylvania Filed May 3, 1957, Ser. No. 656,800

2 Claims. (Cl. 105—315)

This invention relates to high capacity private compartment passenger vehicles providing sitting, sleeping, standing, and toilet facilities in each compartment, the present invention being an improvement over that disclosed in my copending application Serial No. 343,870, filed March 23, 1953, now Patent No. 2,808,787, October 8, 1957, and has for an object the provision of improvements in this art.

In the application referred to, pairs of compartments are arranged each with a pair of bed alcoves in a vertical zone at the window side, a seat in the bed zone, toilet accommodations at the aisle side clear of the bed and seat so as to be available for use at all times, and a folding bed part in a bed alcove. Each compartment provides full-length sleeping accommodations in vertically staggered arrangement with adjacent compartments so that the total length of a pair or of any given number of compartments is less than the product of a bed length multiplied by the number of compartments. Stated another way, each compartment provides full sitting, standing, and reclining space within a volumetric space which in part is less than standing height, which in part is less than reclining length, and which is about double sitting width. Double sitting width corresponds to the space between an aisle wall and the side wall of a normal railway passenger car with a center aisle; and reclining and standing length are considered to be about 6 feet— the height of an average male passenger.

In the specific form shown in the copending application there are two end-hinged folding bed parts in each compartment and the total reclining length of a bed is divided into approximately equal lengths at the meeting point of the folding bed parts.

According to the present invention the bed parts are made of unequal length with the longer bed part disposed under the upper part of the body so that only the feet and the lower part of the legs are disposed on the shorter part of the bed. This places the meeting line of the mattress parts well below the hips so that the entire trunk of the body lies on a smooth unbroken bed part. This is a more comfortable arrangement than that where the dividing line is at the mid-length of the bed.

The short or fixed part of the bed is disposed in a short alcove and there is no part of the mattress which is folded or bent in stowage. One advantage of this arrangement is that the full space above the fixed foot-end mattress part is available for the stowage of bedding— sheets, blankets, pillows, etc. The front of the foot-end alcove can be covered by a curtain or a door. If a door is used it can be hinged at the bottom to pull down to a horizontal position to support the lower end of the longer head-end bed part.

The lower compartment is rearranged to take the long bed part by extending the head-end alcove further upward to a point just below the foot-end alcove of the upper compartment; and the upper compartment is rearranged by extending the head-end bed alcove further upward and also further downward behind the seat to a point just above the foot-end alcove of the lower compartment.

The foot-end fixed bed part for the upper compartment is arranged in a position about at the level of the top of the seat back in the upper compartment to allow the foot-end bed alcove in the upper compartment to be located at a high level and thereby to provide space for the long head-end bed part in the lower compartment to be stowed in a vertical position below the upper foot-end bed alcove. The high position of the bottom of the head-end bed alcove boot of the upper compartment provides space for the long head-end bed part of the lower compartment to be swung down to a use position. By this arrangement there is achieved the desired improved bed arrangement but incidentally the shapes of the transverse partition walls are considerably simplified so that they are easier and less expensive to make.

The indicated and other objects and advantages of the invention will be apparent from the following description of an exemplary embodiment, reference being made to the accompanying drawing thereof, wherein:

Fig. 3 is a longitudinal vertical section taken on the line 3—3 of Fig. 2;

Fig. 4 is a plan view like Fig. 2, taken on the line 4—4 of Fig. 5, but showing a modified form in which the toilet facilities are located in the forward end of the compartments rather than alongside the seats as in the form shown in Figs. 1 to 3; and Fig. 5 is a view like Fig. 3 but taken on the line 5—5 of Fig. 4.

Figure 1:
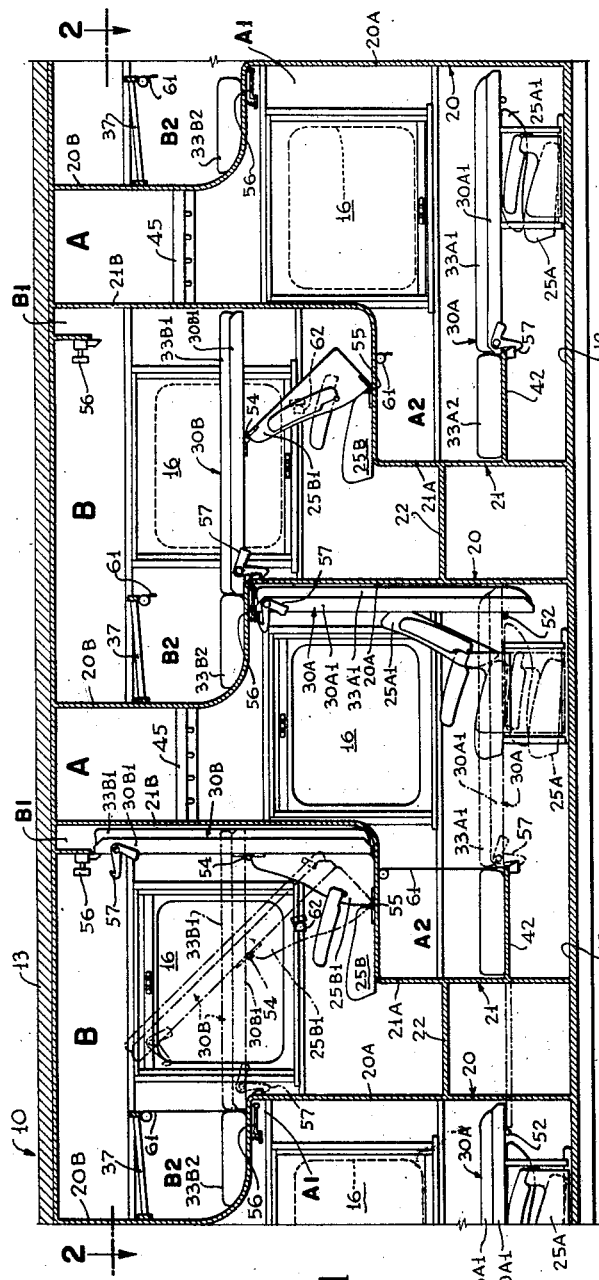
Fig. 1 is a longitudinal vertical section of a group of compartments on one side of an aisle of a railway passenger car, the view being taken on the line 1—1 of Fig. 2.

In the first embodiment, a railway car 10 having longitudinal outer side walls 11, a floor 12, a roof 13, a center aisle 14, aisle walls 15, windows 16, and an aisle ceiling (not shown), is provided on each side of the aisle with a number of compartments defined by the outer and aisle walls and by transverse partition walls 20 and 21.

The compartments are arranged in complemental pairs, including a lower compartment A with its floor at aisle level and an upper compartment B with its floor 22 at a higher level.

In each lower compartment or room A there is a seat 25A, a toilet 26, a folding wash basin 27, a wall mirror (not shown) above the basin, and a bed 30A. The bed comprises a head end folding frame panel 30A1, carrying a mattress part 33A1, and a lower bed part comprising a mattress part 33A2 carried in a fixed support.

Similarly, in each upper compartment B there is a seat 25B, a toilet 26, a folding wash basin 27, a wall mirror, and a bed 30B, the bed comprising a head end folding frame panel 30B1 carrying a mattress part 33B1, and a fixed-base lower end mattress part 33B2.

The main part of each transverse partition wall, 20 or 21, may be considered to be that part which lies in a plane back of the toilet and basin on the aisle side of the room, this plane in the first embodiment being approximately aligned with the back of a seat. As shown in Figs. 3 and 5, this plane extends from floor to ceiling (under the roof frame here) of a room. The seat back is designated as 25A1 for room A and as 25B1 for room B.

Figure 2:
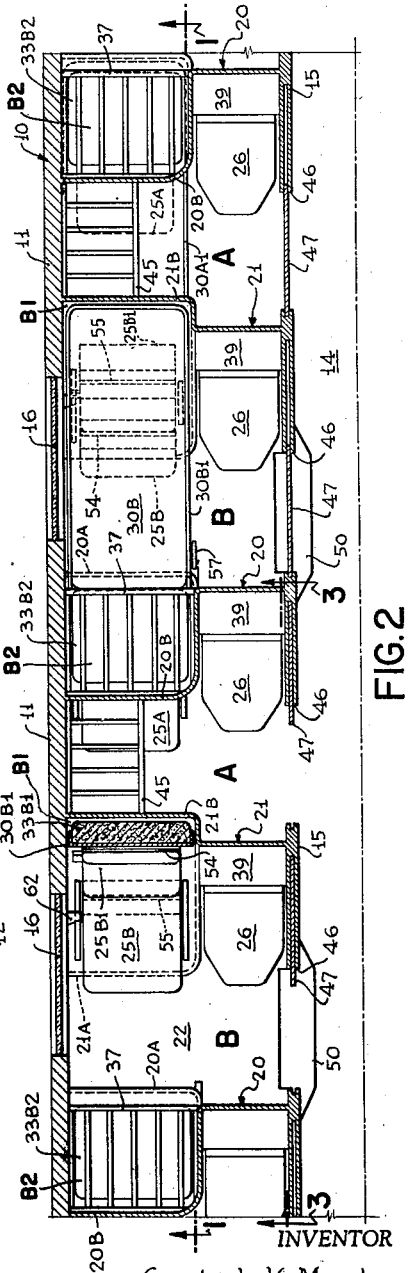
Fig. 2 is a plan view taken on the line 2—2 of Figs. 1 and 3.

The partition wall 20 in the seat and bed zone adjacent the window has a rearwardly offset portion 20A forming with longitudinal side walls, a rearward recess, pocket, or alcove A1 to receive the head end bed part 30A1 carrying the mattress part 33A1 of the lower compartment A. When the head end panel 30A1 of the bed of the lower compartment is in vertical stowed position, as shown in Figs. 1 and 2, it is aligned slightly forward of the main portion of the transverse wall 20.

Above the seat 25A of the lower compartment the wall 20 has a forwardly offset portion 20B forming, with longitudinal side walls, a forward recess, pocket, or alcove B2 to receive the foot end mattress 33B2 of the aft upper compartment B.

The offset portion 20B extends to the ceiling (or roof) and the upper horizontal wall of the alcove B2 forms a shelf 37 for luggage for compartment B.

A cabinet 39 houses the basin 27 and if the toilet 26 is of the folding type, as in the "Combolet" or in the "Travelav," it also may fold up into the cabinet. Herein fixed toilets are shown instead of folding toilets. The back of the cabinet stands against the main part of the partition wall 20. Splash guards may be provided for the toilets when alongside the seats, as in the copending application, but they are omitted here for simplicity.

The partition 21 has a rearwardly offset portion 21B forming, with longitudinal side walls, a rearward recess, pocket, or alcove B1 to receive the head end bed part 30B1 and the mattress part 33B1 of the upper compartment B. When the head end panel 30B1 of the bed of the upper compartment is in vertical stowed position, as shown in Fig. 2, it is aligned with the main portion of the transverse wall 21.

Below the seat 25B of the upper compartment the wall 21 has a forwardly offset portion 21A forming, with longitudinal side walls, a forward recess, pocket, or alcove A2 to receive the foot-end mattress 33A2 of the aft lower compartment A.

The offset portion 21A extends down to the floor and intermediate its height carries an edge of the lower horizontal longitudinal pocket bottom, floor, or shelf 42 which forms the bottom of the alcove A2 which supports the foot-end part 33A2 of the mattress of the lower compartment.

The main portion of the wall 21 behind the cabinet 39 extends from floor to ceiling.

The lower compartment A is provided above the window with a baggage rack 45.

Each compartment is provided with an aisle doorway 46 closed by a door 47.

Steps 50, here including two risers and one tread, are provided at the door of the upper compartment B. The gap at the steps is closed as in the arrangement of the copending application but this need not be detailed here.

The head-end bed part or panel 30A1 of the lower compartment is hinged at 52 and when swung down carries the back of the seat with it and finally folds the back of the seat and the seat frame down, as shown in full lines at the right of Fig. 1. The bed part may be latched in down or stowed position or both, by latch means of any desired form. These latching mechanisms are well known and need not be detailed.

The head-end bed part 30B1 of the upper compartment requires a compound motion about two turning axes, one axis or hinge point 54 being at a connection to an intermediate movable support, as the seat back 25B1, which is pivoted at a fixed axis 55. When in the stowed position the bed parts, for both upper and lower compartments, may be held closed by a latch 56 of suitable design. When in the down or use position the bed parts may be supported on a ledge and held by a suitable latch 57. The other end of the upper hinged bed, where it overhangs the seat back may also be latched, as by a usual plunger latch (not shown). A stop 62 is provided on the side wall to limit the downward movement of the seat back 25B1.

A roller curtain 61 may also be provided for the foot-end alcoves in addition to or in place of a door to enclose the bed clothes.

In the modification shown in Figs. 4 and 5 the arrangement has been changed only in placing the toilet facilities at the front end of the compartments instead of alongside the seats, as in the first modification, the partition walls being changed in shape slightly to suit. The same parts are designated by the same references but with a prime (') added. The partition walls, where changed, are designated as 20' and 21' and their alcove offsets as 20A', 20B' and 21A', 21B', respectively. The toilet cabinet is designated as 39' because of change of location and likewise the toilet is designated as 26' and the basin as 27'. The rearrangement places the doorway at the end away from the toilet.

It is thus seen that compartments are provided in which each compartment has a seat at the window side and that there is a seat in each of all compartments which faces in a common direction.

In each compartment the toilet facilities are at the aisle side for convenient access and where best protected from the outside air conditions.

The beds are all located at the window side, leaving free access to the door at the aisle side.

The toilet facilities are available at all times, whether the beds are in use or stowed positions.

The beds comprise hinged parts of less than full bed length but of considerably more than half bed length which are easily raised and lowered.

There is room between the aisle wall and bed for operating the bed without opening the door.

The beds are of uniform width throughout their length.

There is ample space above the beds for their full length when down in the use position.

There is convenient visibility through the windows both while sitting and reclining.

There are no floors below aisle floor level and the raised floor of the upper compartment is not at a very great height above the aisle floor level.

Full depth mattresses are provided throughout.

The transverse partition walls are of a relatively simple shape for easy and inexpesive fabrication.

The bed clothes and mattresses are amply protected and out of sight.

There is ample standing space in each compartment at all times and when the beds are stowed there is standing space in each compartment at the window.

The hinged bed parts carry the seat backs with them so there is no need to deal with the seat backs separately.

The mattress on the hinged bed part is not bent and there is no loss of space at this alcove.

The bed clothes at the storage or foot alcove are not placed behind a folded-up mattress part.

From the drawings and above description it is evident that the long end-folding bed panels are less than full bed length and considerably more than half bed length so, as stated above, they will support all of the occupant's body except the feet and the lower part of the legs. The provision of bed parts of such length is made conveniently feasible by having the use position of the upper bed at an elevation near the top of the seat back in the upper compartment; having the lower end of the folding part of the upper bed when stowed disposed at about the level of the seat cushion support in the upper compartment, that being the bottom of the upper head-end bed boot-alcove and the top of the lower foot-end bed boot-alcove; having the foldable part of the upper bed hinge about two spaced axes, including that of the seat back; having the use position of the lower bed at a lower elevation at about the normal seat level; having the lower end of the foldable part of the lower bed when stowed extend down considerably below the seat level; and by having the folding bed parts mounted on separate spaced transverse walls to fold in the same direction and having considerable overlap in elevation in a vertical longitudinal plane.

In the enumerated and other ways the arrangement provides improved conveniences and economies.

While two embodiments have been disclosed for purposes of illustration it is to be understood that there may be other embodiments and modifications within the scope of the invention.

What is claimed is:

1. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of occupancy compartments of approximately double sitting width, each compartment having a seat and full-length bed accommodations in a bed zone at the outer side wall, the beds and bed zone being slightly wider than half the compartment width, leaving standing and sitting width space between the bed zone and the aisle wall, the compartments being arranged in a group unit or module of two compartments which together are of considerably less length than two bed lengths, one compartment having a floor at aisle floor level and the other compartment having a floor at a level above the seat cushion level in the lower compartment, each compartment being of sitting length with knee and foot space throughout its width at the seat, each transverse wall being formed with longitudinally and vertically offset boot-alcoves in the bed zone providing companion paired facing alcoves at opposite transverse walls of each compartment for mating bed parts, a fixed bed part in one of each pair of said companion facing alcoves, and a hinged bed part in the other of each pair of said companion facing alcoves, the hinged bed part being mounted to turn about a transverse horizontal axis, said hinged bed part in each compartment in the use position spanning the full length of the compartment between one transverse wall and a companion fixed bed part, and the companion fixed and hinged bed parts in the use position forming a full length bed, the fixed bed part for the lower compartment being located at about seat cushion height, and the upper end of the foldable bed part in the lower compartment in stowed position being disposed at about the level of the top of the seat back in the upper compartment, the fixed bed part for the upper compartment being located somewhat above the level of the top of the seat back in the upper compartment, and the bottom of the hinged bed part of the upper compartment in the stowed position being disposed near the bottom of the seat cushion of the upper compartment, vertically spaced double hinge means, including a rigid swingable member between the spaced axes of the hinges, for the hinged bed part in the upper compartment, said spaced hinge means providing hinging movement about spaced horizontal transverse axes, the lower hinge means being fixed in position and the upper hinge means carrying the bed part moving in an arc at a distance above the fixed hinge means, and means supporting and holding said hinged bed part for the upper compartment in the horizontal use position.

2. A compartment arrangement as set forth in claim 1, wherein said hinged bed part of the upper compartment is hinged to the back of the seat in the compartment and said seat back is hinged at its lower end.

References Cited in the file of this patent
UNITED STATES PATENTS

| | | |
|---|---|---|
| 2,364,595 | Tully et al. | Dec. 5, 1944 |
| 2,546,133 | Patton | Mar. 20, 1951 |
| 2,583,960 | Murphy | Jan. 29, 1952 |
| 2,599,606 | Burgess | June 10, 1952 |
| 2,600,706 | Tully et al. | June 17, 1952 |
| 2,724,347 | Watter | Nov. 22, 1955 |
| 2,743,683 | Calhoun | May 1, 1956 |
| 2,808,787 | Murphy | Oct. 8, 1957 |